(12) United States Patent
Bitner et al.

(10) Patent No.: US 7,890,712 B2
(45) Date of Patent: *Feb. 15, 2011

(54) METHOD, APPARATUS AND PROGRAM PRODUCT FOR MANAGING MEMORY IN A VIRTUAL COMPUTING SYSTEM

(75) Inventors: William J. Bitner, Johnson City, NY (US); Christine T. Casey, Endicott, NY (US); Steven S. Shultz, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 221 days.

This patent is subject to a terminal disclaimer.

(21) Appl. No.: 12/347,177

(22) Filed: Dec. 31, 2008

(65) Prior Publication Data

US 2009/0113161 A1 Apr. 30, 2009

Related U.S. Application Data

(63) Continuation of application No. 11/325,812, filed on Jan. 5, 2006, now Pat. No. 7,487,307.

(51) Int. Cl.
*G06F 13/00* (2006.01)
*G06F 12/00* (2006.01)

(52) U.S. Cl. .................. 711/159; 711/100; 711/154; 711/170

(58) Field of Classification Search .............. 711/5, 711/100, 147, 148, 154, 159, 165, 170
See application file for complete search history.

(56) References Cited

U.S. PATENT DOCUMENTS

| | | | |
|---|---|---|---|
| 5,010,481 A * | 4/1991 | Ishida | 711/171 |
| 6,590,865 B1 | 7/2003 | Ibaraki et al. | |
| 6,789,156 B1 * | 9/2004 | Waldspurger | 711/6 |
| 6,856,320 B1 | 2/2005 | Rubenstein et al. | |
| 7,240,239 B2 * | 7/2007 | Suzaki | 714/15 |
| 2002/0023156 A1 | 2/2002 | Chujo et al. | |
| 2002/0082856 A1 | 6/2002 | Gray et al. | |
| 2003/0095560 A1 | 5/2003 | Arita et al. | |
| 2005/0044205 A1 | 2/2005 | Sankaranarayan et al. | |
| 2005/0050531 A1 * | 3/2005 | Lee | 717/153 |
| 2005/0140683 A1 | 6/2005 | Collins et al. | |

* cited by examiner

*Primary Examiner*—Tuan V. Thai
(74) *Attorney, Agent, or Firm*—Dennis Jung

(57) ABSTRACT

A method for managing memory in a virtual computing system is provided. The method comprises providing updated monitor data for a plurality of data domains in the virtual computing system and determining based upon the updated monitor data provided whether there is a memory constraint in a memory of the virtual computing system. Further, the method comprises calculating based upon the updated monitor data, when the memory constraint is determined, a total release-amount of the memory that is to be released by the virtual computing system in order to relieve the memory constraint and issuing a notification to release the total release-amount of the memory in order to relieve the memory constraint. The method further comprises assessing based upon the updated monitor data, when the memory constraint is ended, a reuse-amount that can be reused by the plurality of virtual guests.

6 Claims, 6 Drawing Sheets

METHOD, APPARATUS AND PROGRAM PRODUCT FOR MANAGING MEMORY IN A VIRTUAL COMPUTING SYSTEM

CROSS REFERENCE TO RELATED APPLICATION

This is a continuation application of U.S. patent application Ser. No. 11/325,812, which was filed on Jan. 5, 2006 and is now US Published Patent Application No. 20070156981 A1.

FIELD OF THE INVENTION

The present invention relates to a method, apparatus and program product for managing memory in a virtual computing system. More particularly, the present invention relates to a method, apparatus and program product for managing virtual memory among a plurality of guest virtual machines using a resource manager that comprises a memory management component.

BACKGROUND OF THE INVENTION

In today's business environment, organizations and/or businesses utilize a wide variety of software and/or hardware components in order to allocate and optimize the use of a limited amount of physical or real memory among the various processes that need it. One technique for optimizing memory is the use of virtual memory, which simulates a much larger address space than is actually available, using a reserved storage area for objects that are not in physical or real memory. Virtual memory makes a computer appear to have more physical memory than it actually does. This is accomplished by software that swaps unused resources out of physical memory and replaces these resources with those required to execute a current operation. Accordingly, there is a need to simplify the process of optimizing performance using virtual memory, while at the same time controlling any costs associated with such optimization.

SUMMARY OF THE INVENTION

In one aspect of the invention, there is provided a method for managing memory in a virtual computing system. The method comprises providing updated monitor data for a plurality of data domains in the virtual computing system and determining based upon the updated monitor data provided whether there is a memory constraint in a memory of the virtual computing system. Further, the method comprises calculating based upon the updated monitor data, when the memory constraint is determined, a total release-amount of the memory that is to be released by the virtual computing system in order to relieve the memory constraint and issuing a notification to release the total release-amount of the memory in order to relieve the memory constraint. The method further comprises assessing based upon the updated monitor data, when the memory constraint is ended, a reuse-amount that can be reused by the plurality of virtual guests. In a preferred embodiment, the providing step further comprises collecting monitor data for a plurality of data domains in the virtual computing system and updating at pre-determined intervals the monitor data for the plurality of data domains in the virtual computing system. In a preferred embodiment, the determining step further comprises allocating one or more pages in the memory to each of a plurality of virtual guests, identifying a subset of the plurality of virtual guests who should be notified when the memory constraint arises and running a plurality of constraint algorithms to determine whether there is the memory constraint in the memory of the virtual computing system. In a preferred embodiment, the calculating step further comprises running a total-release algorithm to calculate the total release-amount of the memory that is to be released by the virtual computing system in order to relieve the memory constraint and running an individual-release algorithm to calculate an individual release-amount to be released by each of the subset of the plurality of virtual guests. In a preferred embodiment, the issuing step includes issuing the notification to each of the subset of the plurality of virtual guests identified when the memory constraint arises. Further, the assessing step includes running a reuse algorithm to calculate the reuse-amount that can be reused by the plurality of virtual guests when the memory constraint is ended.

In another aspect of the invention, there is provided an apparatus for managing memory in a virtual computing system. The apparatus comprises a plurality of virtual guests configured to share a memory in the virtual computing system, the memory being allocated to each of the plurality of virtual guests and a control program running on a server and configured to gather updated monitor data for a plurality of data domains in the virtual computing system. The apparatus further comprises a memory management component configured to use the updated monitor data to determine if there is the memory constraint and when the memory constraint is determined, to use the updated monitor data to calculate a total release-amount of the memory that is allocated and needs to be released in order to relieve the memory constraint and a resource manager coupled to each of the memory, the control program and the memory management component, the resource manager being configured to notify the plurality of virtual guests to release the total release-amount of the memory to relieve the memory constraint. In a preferred embodiment, the memory management component runs a plurality of constraint algorithms based on the updated monitor data to determine if there is the memory constraint and wherein the memory management component runs a total-release algorithm based on the updated monitor data to calculate the total release-amount of the memory to be released in order to relieve the memory constraint. In a preferred embodiment, the memory management component runs an individual-release algorithm based on the updated monitor data to calculate an individual release-amount of the total release-amount calculated that needs to be released from each of the subset of the plurality of guests in order to relieve the memory constraint. In a preferred embodiment, the memory management component is further configured to detect when the memory constraint is ended and to calculate a reuse-amount of the memory that can be reused by the subset of the plurality of guests. In a preferred embodiment, the memory management component is implemented within the resource manager of the virtual computing system. Further, in a preferred embodiment, the memory comprises virtual memory that is divided into a plurality of pages and, preferably, the one or more of the plurality of pages are allocated to each of the plurality of virtual guests. Further, in a preferred embodiment, the plurality of data domains comprises a system data domain and a storage data domain. Preferably, the system data domain monitor data comprises at least one of: number of virtual guests on dispatch list waiting for pages, total number of virtual guests on dispatch list, number of times available-frame list went empty for each virtual guest, number of first passes completed by control program, number of second passes completed by control program, number of emergency passes completed by control program and total number of passes completed by control program. Further, preferably, the storage data domain monitor data comprises at least one of: total storage available for general use, total working set size of all virtual guests on dispatch list, high threshold value for available-frame list of memory frames, low threshold value for available-frame list of memory frames, number of frames on available-frame list, working set size for each virtual guest, count of resident pages for each virtual guest, count of resident referenced frames and count of reserved pages for each virtual guest.

In yet another aspect of the invention, there is provided a computer program product for managing memory in a virtual computing system. The computer program product comprises a computer readable medium, first program instructions to update monitor data for a plurality of data domains in the virtual computing system and second program instructions to determine using the updated monitor data whether there is a memory constraint in a memory of the virtual computing system. The computer program product further comprises third program instructions to calculate, when the memory constraint is determined, a total release-amount of the memory that needs to be released based the updated monitor data in order to relieve the memory constraint and fourth program instructions to issue a notification to release the total release-amount of the memory in order to relieve the memory constraint. The computer program product further comprises fifth program instructions to assess, when the memory constraint is ended, a reuse-amount of the memory that can be reused based upon the updated monitor data. Preferably, the first, second, third, fourth and fifth program instructions are stored on the medium. In a preferred embodiment, the second program instructions further comprise instructions to allocate one or more pages in the memory to each of a plurality of virtual guests, to identify a subset of the plurality of virtual guests who should be notified when the memory constraint arises and to run a plurality of constraint algorithms to determine whether there is the memory constraint in the memory of the virtual computing system. In a preferred embodiment, the third program instructions further comprise instructions to run a total-release algorithm to calculate the total release-amount of the memory that needs to be released in order to relieve the memory constraint. In a preferred embodiment, the fourth program instructions further comprise instructions to issue the notification to each of the subset of the plurality of virtual guests identified when the memory constraint arises. In a preferred embodiment, the fifth program instructions further comprise instructions to run a reuse algorithm to assess the reuse-number of the memory that can be reused by the subset of the plurality of virtual guests when the memory constraint is ended.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
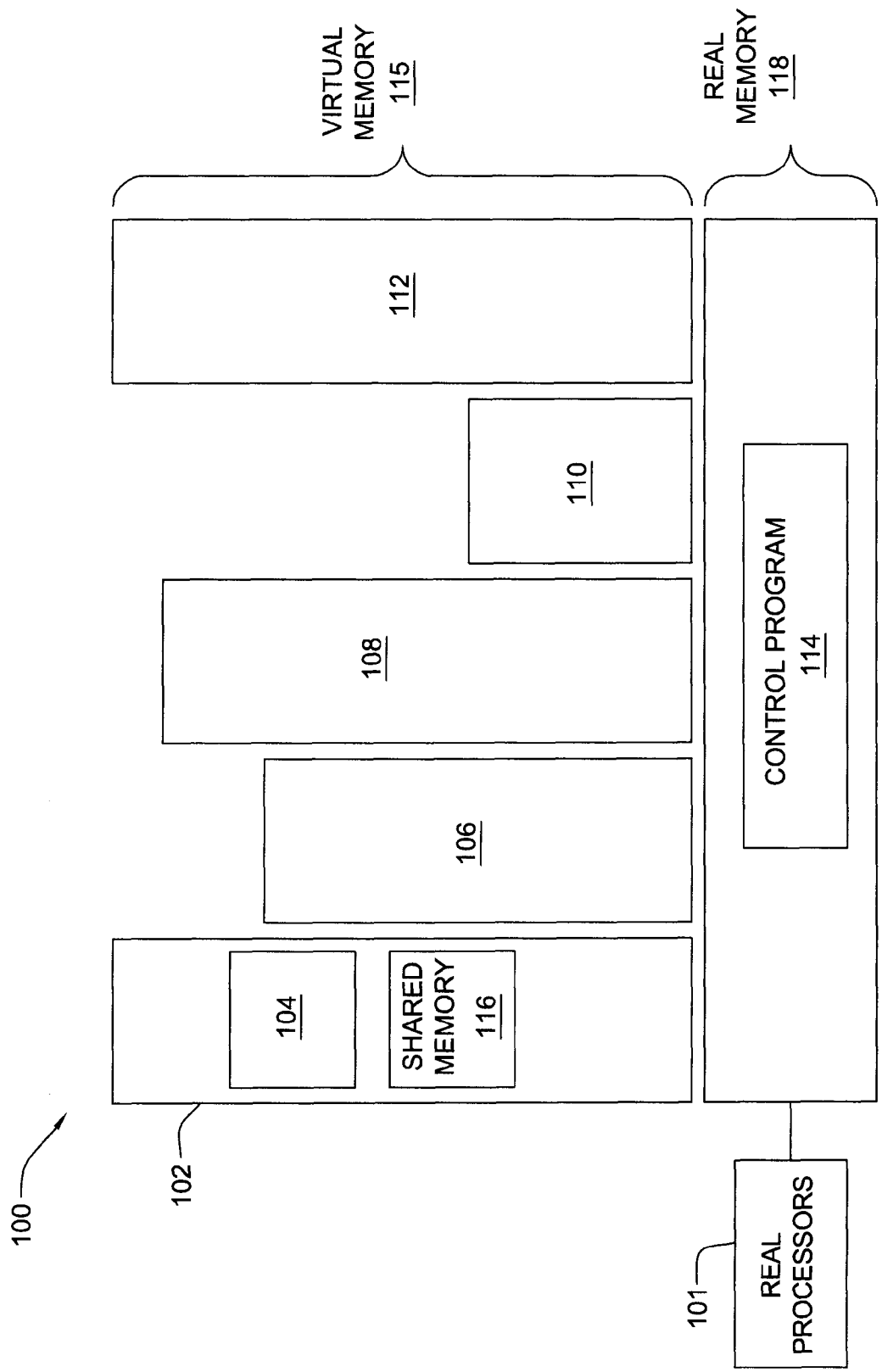
FIG. 1 is a block diagram illustrating a memory that is allocated to a plurality of guest virtual machines and is configured for managing memory among the plurality of guest virtual machines in a virtual computing system, in accordance with an embodiment of the invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a method for managing memory in a virtual computing system. The method comprises providing updated monitor data for a plurality of data domains in the virtual computing system and determining based upon the updated monitor data provided whether there is a memory constraint in a memory of the virtual computing system. Further, the method comprises calculating based upon the updated monitor data, when the memory constraint is determined, a total release-amount of the memory that is to be released by the virtual computing system in order to relieve the memory constraint and issuing a notification to release the total release-amount of the memory in order to relieve the memory constraint. The method further comprises assessing based upon the updated monitor data, when the memory constraint is ended, a reuse-amount that can be reused by the plurality of virtual guests. In a preferred embodiment, the providing step further comprises collecting monitor data for a plurality of data domains in the virtual computing system and updating at pre-determined intervals the monitor data for the plurality of data domains in the virtual computing system. In a preferred embodiment, the determining step further comprises allocating one or more pages in the memory to each of a plurality of virtual guests, identifying a subset of the plurality of virtual guests who should be notified when the memory constraint arises and running a plurality of constraint algorithms to determine whether there is the memory constraint in the memory of the virtual computing system. In a preferred embodiment, the calculating step further comprises running a total-release algorithm to calculate the total release-amount of the memory that is to be released by the virtual computing system in order to relieve the memory constraint and running an individual-release algorithm to calculate an individual release-amount to be released by each of the subset of the plurality of virtual guests. In a preferred embodiment, the issuing step includes issuing the notification to each of the subset of the plurality of virtual guests identified when the memory constraint arises. Further, the assessing step includes running a reuse algorithm to calculate the reuse-amount that can be reused by the plurality of virtual guests when the memory constraint is ended.

As used herein, the term "resource manager" or "virtual machine resource manager" refers to software that is implemented within a computing system that provides a virtual computing environment. Further, the term "control program" refers to a program or code that is responsible for allocating the processing power of available real processors 101 in order to process guest virtual machine instructions. Further, the term "memory management component" refers to a new program or code that is, preferably, implemented within the resource manager and is configured to manage virtual memory among a plurality of guest virtual machines in a virtual computing system. The term "guest virtual machine" or "virtual machine" or "virtual guest" refers to any machine that shares resources in the virtual computing system. Additionally, the term "updated monitor data" or "monitor data" refers to data that is collected and updated at predetermined interval by the control program, such that the updated monitor data can be used by the resource manager to manage virtual memory among the guest virtual machines in the virtual computing system. Further, the term "release" or "return" refers to allocated pages that need to be returned or released by one or more of the guest virtual machines when there is a memory or system constraint. Furthermore, the term "reuse" or "reclaim" refers to pages that may be reused or reclaimed by one or more of the guest virtual machines when a memory or system constraint no longer exists.

Reference is now made to FIG. 1, which illustrates one embodiment of a memory of an apparatus or system 100 for managing memory, preferably, virtual memory in a virtual computing system, in accordance with an embodiment of the invention. The memory 100 of FIG. 1 comprises real memory 118 and virtual memory 115. Further, the virtual memory 115 is divided, preferably, into a plurality of pages that are allocated to each of a plurality of guest virtual machines, in particular, 102, 106, 108, 110 and 112. In a preferred embodiment, the real memory 118 includes a control program 114 that is configured to collect or gather monitor data for a plurality of data domains in the virtual computing system and is configured to update, at predetermined intervals, the monitor data for the plurality of data domains in the virtual computing system. In a preferred embodiment, the monitor data updated by the control program 114 is stored in the shared memory 116 of virtual memory 115. Further, in a preferred embodiment, the virtual machine 102 in virtual memory 115 comprises a virtual machine resource manager 102, which in a preferred embodiment includes a memory management component 104 and a shared memory 116. In a preferred embodiment, the virtual machine resource manager 102 manages each of the other guest virtual machines 106, 108, 110 and 112 using the memory management component 104 and the updated monitor data stored in the shared memory 116 by the control program 114 to manage memory with respect to each of the guest virtual machines 106, 108, 110 and 112.

Figure 2:
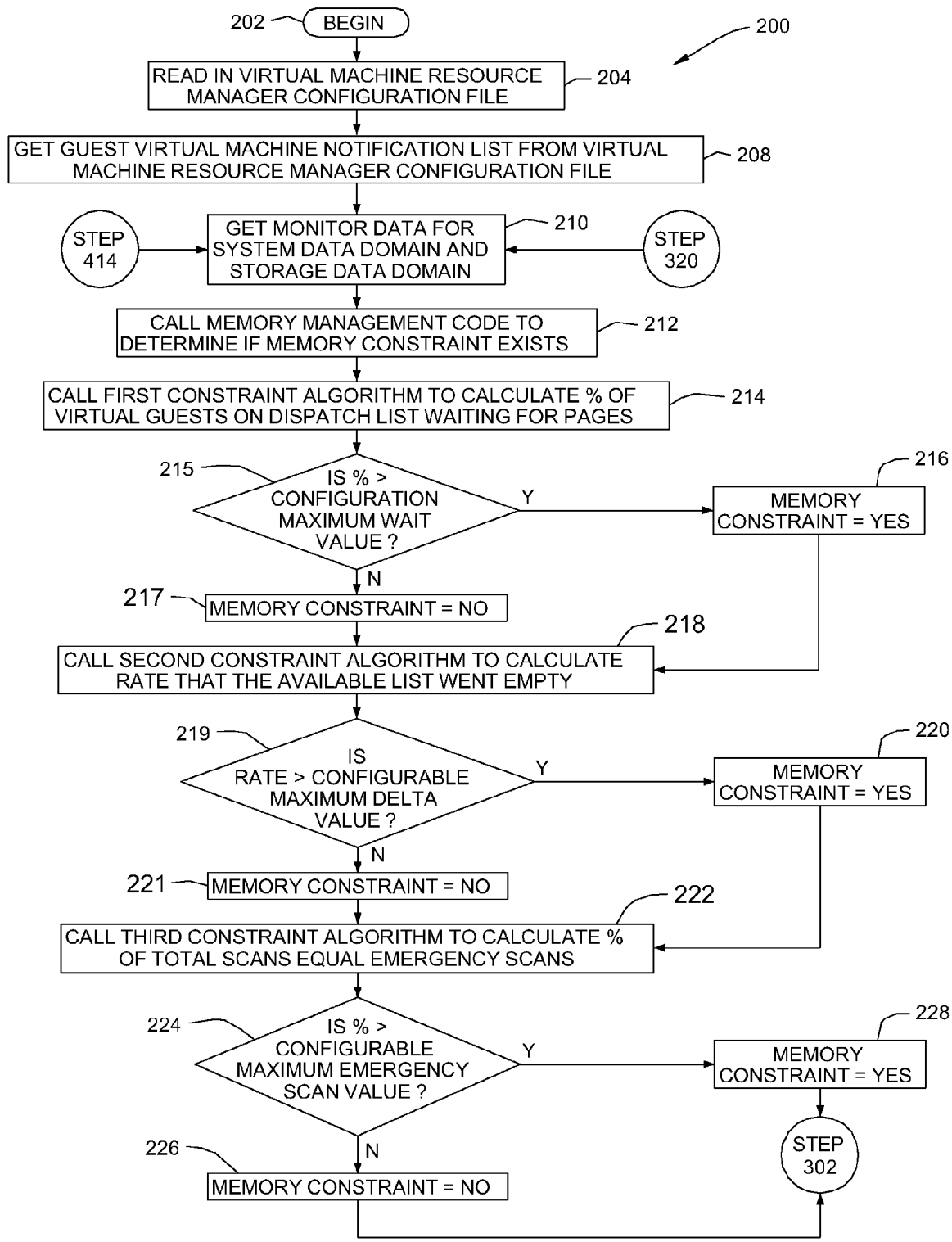
FIG. 2 is an illustration of a flowchart depicting a method for managing memory in a virtual computing system, in accordance with an embodiment of the invention.
Figure 3:
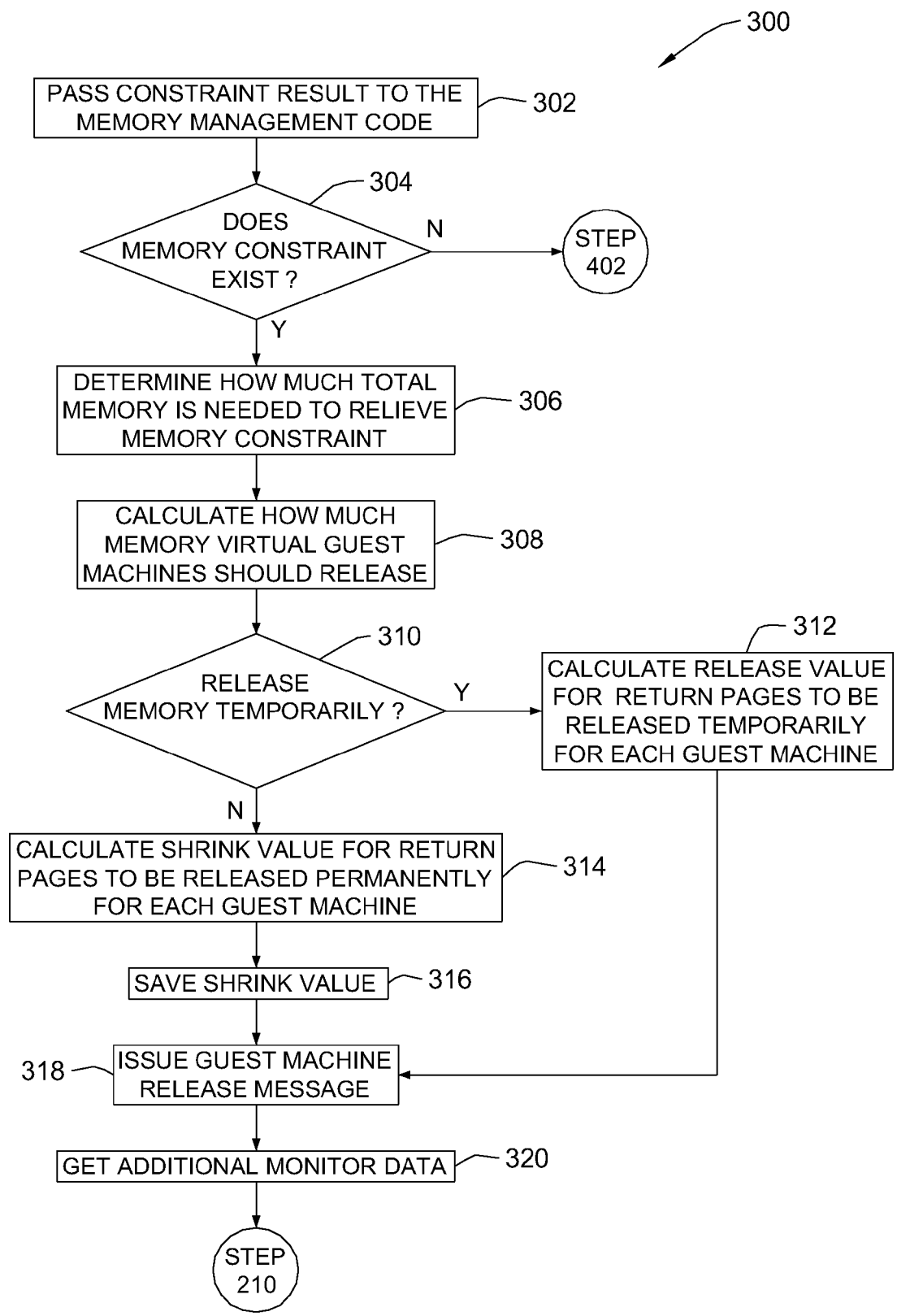
FIG. 3 is an illustration of a flowchart depicting a method for managing memory in a virtual computing system, in accordance with an embodiment of the invention.
Figure 4:
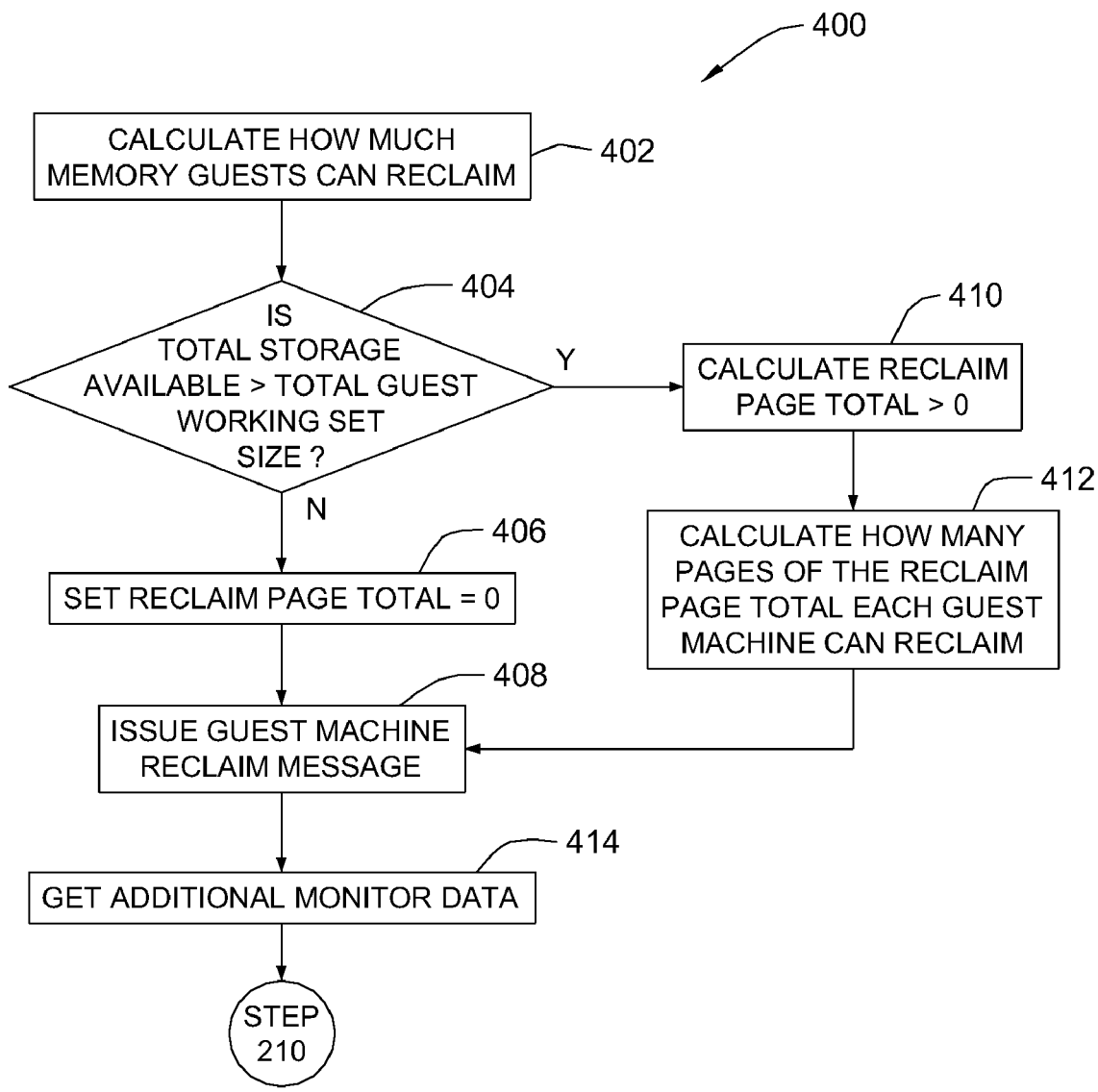
FIG. 4 is an illustration of a flowchart depicting a method for managing memory in a virtual computing system, in accordance with an embodiment of the invention.

Reference is now made to FIGS. 2-4, which together depict a method for managing memory in a virtual computing system. Turning to FIG. 2, reference numeral 200 depicts a first subset of steps included in the method for managing memory, preferably, virtual memory in a virtual computing system, using the memory management component or code included with the resource manager or virtual machine resource manager 102 (discussed in FIG. 1), in accordance with one embodiment of the invention. The method begins at step 202 with the resource manager reading the virtual machine resource manager configuration file in step 204. Further, the resource manager gets or obtains monitor data for a plurality of data domains that is stored within the resource manager 102 of FIG. 1 in step 210. The step 320 leading to step 210 and the step 414 leading to step 210 will be discussed with respect to FIGS. 3 and 4, respectively, herein below. Preferably, the monitor data collected in step 210 comprises system data domain and storage data domain. In a preferred embodiment, the system data domain monitor data comprises at least one of number of virtual guests on dispatch list waiting for pages, total number of virtual guests on dispatch list, number of times available-frame list went empty for each virtual guest, number of first passes completed by control program, number of second passes completed by control program, number of emergency passes completed by control program and total number of passes completed by control program. Further, in a preferred embodiment, the storage or memory data domain monitor data comprises at least one of total storage available for general use, total working set size of all virtual guests on dispatch list, high threshold value for available-frame list of memory frames, low threshold value for available-frame list of memory frames, number of frames on available-frame list, working set size for each virtual guest, count of resident pages for each virtual guest, count of resident referenced frames and count of reserved pages for each virtual guest.

After the resource manager obtains monitor data in step 210, the resource manager calls the memory management component or code in step 212 to determine whether a memory constraint exists. Preferably, the memory management component or code calls a first constraint algorithm in step 214 to calculate the percentage of virtual guests on a dispatch list that are waiting for pages, referred to as a "wait value". In step 215, a determination is made using the monitor data as to whether or not the percentage calculated is greater than a configurable maximum wait value that is predetermined and set forth in the virtual machine resource manager configuration file. If it is determined that the percentage calculated is greater than the configurable maximum wait value in step 215, then the resource manager has established that a memory constraint exists and sets the constraint flag to "yes" in step 216 and proceeds to step 218. On the other hand, if it is determined that the percentage calculated is not greater than the configurable maximum wait value in step 215, then the resource manager has established that a memory constraint does not exist and sets the constraint flag to "no" in step 217 and proceeds to step 218. In step 218, the memory management component or code calls a second constraint algorithm to calculate the rate per second at which the available list went empty, referred to as the "delta value". The delta value for which the available list went empty is measured between a current interval and a previous interval. In a preferred embodiment, a default monitor rate of 60 seconds is used, however, this rate can be changed and configured to suit a given system. The available list provides a list of available memory frames or pages. In step 219, a determination is made as to whether or not the rate calculated in step 218 is greater than a configurable maximum delta value that is predetermined and set forth in the virtual machine resource manager configuration file. If it is determined that the rate calculated is greater than the configurable maximum delta value in step 218, then the resource manager has established that a memory constraint exists and sets the constraint flag to "yes" in step 220 and proceeds to step 222. On the other hand, if it is determined that the rate calculated in step 218 is not greater than the configurable maximum delta value in step 218, then the resource manager has established that a memory constraint does not exist and sets the constraint flag to "no" in step 221 and proceeds to step 222. In step 222, the memory management component or code calls a third constraint algorithm to calculate the percentage of emergency pass or scans out of the total number of scans, referred to as the "emergency scan value". The control program preferably takes a first, second, or an emergency pass or scan. To determine constraint, we check what percentage of times control program had to do an emergency pass out of the total scans. This is done for each processor. In step 224, a determination is made as to whether or not the percentage calculated in step 222 is greater than a configurable maximum emergency scan value that is predetermined and set forth in the virtual machine resource manager configuration file. In a preferred embodiment, the emergency scan value is set to 1%, however, the emergency scan value can be configured to suit a given system. If it is determined that the percentage calculated in step in 222 is greater than the configurable maximum emergency scan value, then the resource manager has established that a memory constraint exists and sets the constraint flag to "yes" in step 228 and proceeds to step 302, which is described herein below with respect to FIG. 3. On the other hand, if it is determined that the percentage calculated is not greater than the configurable maximum emergency scan value in step 222, then the resource manager has established that a memory constraint does not exist and sets the constraint flag to "no" in step 226 and proceeds to step 302, which is described herein below with respect to FIG. 3.

Turning to FIG. 3, reference numeral 300 comprises a second subset of steps, which are a continuation of the first subset of steps discussed with respect to FIG. 2, and which further outline the method for managing virtual memory in a virtual computing system. Referring back to FIG. 2, once the resource manager has determined whether a memory constraint exists in step 228 or whether a memory constraint does not exist in step 226, the results of the determination in steps 226 and 228 are passed to the memory management component or code in step 302 of FIG. 3. In step 304, a determination is made as to whether the memory constraint exists. If it is determined in step 304 that a memory constraint does not exist (that is, the memory constraint flag is set to "no"), then the method proceeds to step 402, which is described herein below with respect to FIG. 4. However, if it is determined in step 304 that a memory constraint exists (that is, the memory constraint flag is set to "yes"), then the memory management component or code determines in step 306 how much total memory is needed to relieve the memory constraint, that is, how much memory needs to be released (also referred to as release-amount) by the guest virtual machines on the notification list provided in the virtual machine resource manager configuration file. In a preferred embodiment, the memory needed is equal to the total working set size of users in the dispatch list minus the total memory available for general use. In a preferred embodiment, the memory needed is equal to the total working set size of users in the dispatch list minus the total virtual memory available for general use. The working set size number is a projection of the number of pages that must occupy real memory in order to process a guest virtual machine's transactions or instructions efficiently. The working set size is obtained from the monitor data. Further, the memory management component or code calculates in step 308 how much memory the guest virtual machines should release. In a preferred embodiment, the percentage of each guest's working set size to the total working set size is determined to figure out how much memory (number of pages), also referred to as "individual release-amount" should be released by each guest. If the virtual machine's working set size minus the release-amount calculated is less than the total number of reserved pages (number of pages that the specified guest virtual machine is entitled to have resident in real memory at all times) plus the number of locked pages (number of pages that are permanently locked in real memory), then the release-amount is set to zero, that is, the guest virtual machine cannot release any pages. Furthermore, a determination is made as to whether the memory to be released by the guest virtual machines is intended to be temporary or permanent. If it is determined in step 310 that the memory to be released by the guest virtual machines is intended to be temporary, then the memory management component or code calculates in step 312 a release value for return pages to be released temporarily by each of the guest virtual machines and the method proceeds to step 318, as described herein below. However, if it is determined in step 310 that the memory to be released by the guest virtual machines is intended to be permanent, then the memory management component or code calculates in step 314 a shrink value for return pages to be released permanently by each of the guest virtual machines. The shrink value is saved in step 316, such that, the shrink value can be used in a next iteration. Further, after steps 312 and 316, the method proceeds in step 318, where a message or notification is issued to each of the designated guest virtual machines, that is, the guest virtual machines to be notified to release memory when there is a memory constraint as set forth in the notification list provided in the virtual machine resource manager configuration file in step 208 of FIG. 2. If the memory to be released by the designated guest virtual machines is to be temporary, then the guest virtual machines are provided in the notification in step 318 with the release value for return pages to be released temporarily by the designated guest virtual machines. However, on the other hand, if the memory to be released by the designated guest virtual machines is to be permanent, then the guest virtual machines are provided in the notification in step 318 with the shrink value for return pages to be released permanently by the designated guest virtual machines. The resource manager continues monitoring for memory constraint by getting or obtaining additional monitor data in step 320, which takes the process back to step 210 of FIG. 2.

Turning to FIG. 4, reference numeral 400 a third subset of steps, which are a continuation of the first and second subset of steps discussed with respect to FIGS. 2 and 3, and which further outline the method for managing virtual memory in a virtual computing system. Referring back to FIG. 3, if it is determined in step 304 that a memory constraint does not exist (that is, the memory constraint flag is set to "no"), then the method proceeds to step 402. In particular, a calculation is made in step 402 as to how much memory guests can reclaim or reuse when a memory constraint no longer exists. In a preferred embodiment, the reuse-amount is based on the difference between the total memory available minus the total working set size of all the virtual machines in the dispatch list. Further, it is determined in step 404 whether or not the total storage or memory available is greater than the total guest working set size. If it is determined in step 404 that the total storage available is not greater than the total guest working set size, then the memory management component or code sets the reclaim page total to zero in step 406, that is, the guest virtual machines cannot reclaim or reuse any pages despite the non-existence of a memory constraint. However, if it is determined in step 404 that the total storage available is greater than the total guest working set size, then the memory management component or code calculates in step 410 a reclaim page total value (also referred to as a reuse-amount) that is greater than zero, that is, the guest virtual machines can reclaim or reuse a certain number of pages as calculated in step 410. Further, in step 412, the memory management component or code calculates how many pages of the reclaim page total calculated in step 410 that each of the guest virtual machines can reclaim or reuse (also referred to as an individual reuse-amount). After either setting the reclaim page total to zero in step 406 or calculating the individual reuse-amount in step 412, the resource manager issues in step 408 a reclaim or reuse message or notification to the guest virtual machines and proceeds to monitor for memory constraint by getting additional monitor data in step 414, which repeats the process at step 210 of FIG. 2. As mentioned herein earlier, in FIGS. 2-4, any of the values calculated by using configurable values that are pre-determined or pre-established in the virtual machine resource manager configuration file can be changed or configured to fit the technical and/or business requirements of a virtual computing system that uses the process of this invention.

In another embodiment, the present invention provides an apparatus for managing memory in a virtual computing system. The apparatus comprises a plurality of virtual guests configured to share a memory in the virtual computing system, the memory being allocated to each of the plurality of virtual guests and a control program running on a server and configured to gather updated monitor data for a plurality of data domains in the virtual computing system. The apparatus further comprises a memory management component configured to use the updated monitor data to determine if there is the memory constraint and when the memory constraint is determined, to use the updated monitor data to calculate a total release-amount of the memory that is allocated and needs to be released in order to relieve the memory constraint and a resource manager coupled to each of the memory, the control program and the memory management component, the resource manager being configured to notify the plurality of virtual guests to release the total release-amount of the memory to relieve the memory constraint. In a preferred embodiment, the memory management component runs a plurality of constraint algorithms based on the updated monitor data to determine if there is the memory constraint and wherein the memory management component runs a total-release algorithm based on the updated monitor data to calculate the total release-amount of the memory to be released in order to relieve the memory constraint. In a preferred embodiment, the memory management component runs an individual-release algorithm based on the updated monitor data to calculate an individual release-amount of the total release-amount calculated that needs to be released from each of the subset of the plurality of guests in order to relieve the memory constraint. In a preferred embodiment, the memory management component is further configured to detect when the memory constraint is ended and to calculate a reuse-amount of the memory that can be reused by the subset of the plurality of guests. In a preferred embodiment, the memory management component is implemented within the resource manager of the virtual computing system. Further, in a preferred embodiment, the memory comprises virtual memory that is divided into a plurality of pages and, preferably, the one or more of the plurality of pages are allocated to each of the plurality of virtual guests. Further, in a preferred embodiment, the plurality of data domains comprises a system data domain and a storage data domain. Preferably, the system data domain monitor data comprises at least one of: number of virtual guests on dispatch list waiting for pages, total number of virtual guests on dispatch list, number of times available-frame list went empty for each virtual guest, number of first passes completed by control program, number of second passes completed by control program, number of emergency passes completed by control program and total number of passes completed by control program. Further, preferably, the storage data domain monitor data comprises at least one of: total storage available for general use, total working set size of all virtual guests on dispatch list, high threshold value for available-frame list of memory frames, low threshold value for available-frame list of memory frames, number of frames on available-frame list, working set size for each virtual guest, count of resident pages for each virtual guest, count of resident referenced frames and count of reserved pages for each virtual guest.

Figure 5:
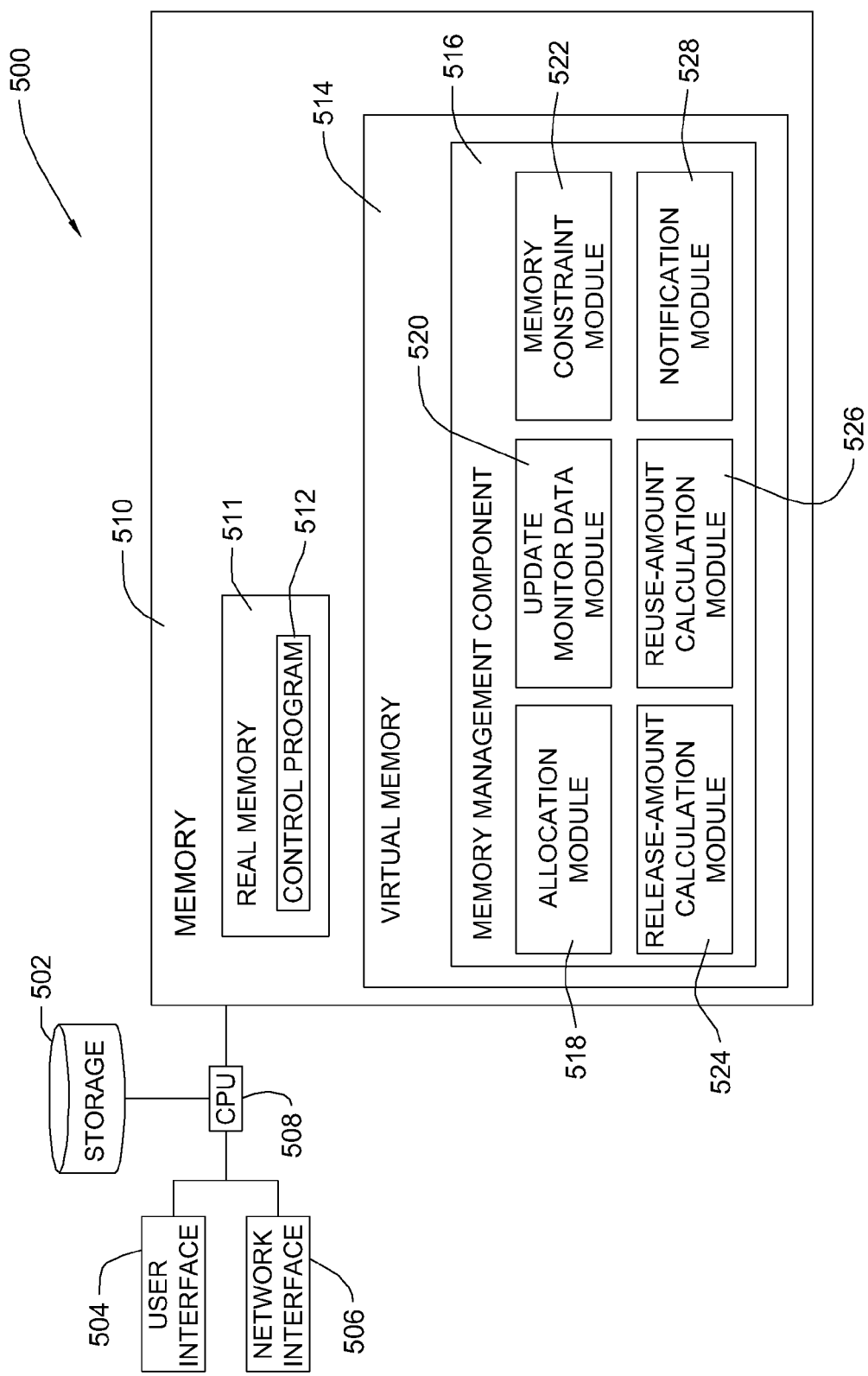
FIG. 5 is a block diagram illustrating one embodiment of a virtual computing system that is configured to manage memory, in accordance with an embodiment of the present invention.

Turning to FIG. 5, reference numeral 500 shows an embodiment of a resource manager 500, preferably, a virtual machine resource manager that is configured to manage virtual memory in a virtual computing system. FIG. 5 shows an embodiment of a resource manager 500. Preferably, the resource manager 500 includes a central processing unit (CPU) 508, a local storage device 502, a user interface 504, a network interface 506, a memory 510 that comprises real memory 511 and virtual memory 514. The CPU 508 is configured generally to execute operations within the resource manager 500. The user interface 504, in one embodiment, is configured to allow a user to interact with the resource manager 500, including allowing input data and commands from a user and communicating output data to the user. The network interface 506 is configured, in one embodiment, to facilitate network communications of the resource manager 511 over a network connection (not shown in any of the drawings). The real memory 510 of memory 510 is configured, in one embodiment, to store the control program 512 as well as several data and metadata files that may be used for obtaining and updating monitor data for the system and storage data domains. In an alternative embodiment, some or all of these data and metadata files may be replicated in the local storage device 502. In a further embodiment, one or all of these data and metadata files may be stored exclusively in the local storage device 502 rather than in the memory 510. In another embodiment, one or all of these data and metadata files may be stored in distributed storage on the system 100 of FIG. 1.

Further, in one embodiment, the virtual memory 514 comprises the resource manager that includes a memory management component or code 516 that comprises several modules, including an allocation module 518, an update monitor data module 520, a memory constraint module 522, a release-amount calculation module 524, a reuse-amount calculation module 526 and a notification module 528. The memory management component or code within the resource manager 500 is provided with a logic unit containing a plurality of modules configured to functionally execute the necessary steps of releasing the reserve memory segment at the resource manager in order to restore the resource manager, for instance, when a memory constraint occurs. The purpose of the memory management component or code 516 is to implement various methods of managing virtual memory among a plurality of guest virtual machines that share virtual memory in a virtual computing system. In a preferred embodiment, the allocation module 518 allocates portions of the virtual memory 514 to each of a plurality of guest virtual machines, and preferably, allocates pages to each of the plurality of guest virtual machines. In a preferred embodiment, the update monitor data module 520 gathers and updates monitor data for a plurality of data domains, preferably, monitor data pertaining to system data domain and monitor data pertaining to storage data domain. In a preferred embodiment, the memory constraint module 522 is configured to determine, based on the updated monitor data whether or not a memory constraint exists. Further, in a preferred embodiment, the release-amount calculation module 524 calculates a total release-amount that needs to be released by the guest virtual machines in order to relieve the memory constraint. Further, in a preferred embodiment, the release-amount calculation module 524 also calculates an individual release-amount that needs to be released by each of the guest virtual machines in order to relieve the memory constraint. In a preferred embodiment, the reuse-amount calculation module 526 calculates a total reuse-amount that can be reused or reclaimed by the guest virtual machines when there is no memory constraint. Further, in a preferred embodiment, the reuse-amount calculation module 526 also calculates an individual reuse-amount that can be reused or reclaimed by each of the guest virtual machines when a memory constraint is ended. Further, in a preferred embodiment, the notification module 528 is configured to notify one or more of the guest virtual machines that there is a memory constraint and to releases memory based on the release-amount calculated by the release-amount calculation module 524, and the notification module 528 is further configured to notify one or more of the guest virtual machines that there is no longer a memory constraint and that memory may be reused or reclaimed based on the reuse-amount calculated by the reuse-amount calculation module 526.

The functional units of the reserve memory segment program 512 described herein above have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data.

In yet another embodiment, the present invention provides a computer program product for managing memory in a virtual computing system. The computer program product comprises a computer readable medium, first program instructions to update monitor data for a plurality of data domains in the virtual computing system and second program instructions to determine using the updated monitor data whether there is a memory constraint in a memory of the virtual computing system. The computer program product further comprises third program instructions to calculate, when the memory constraint is determined, a total release-amount of the memory that needs to be released based the updated monitor data in order to relieve the memory constraint and fourth program instructions to issue a notification to release the total release-amount of the memory in order to relieve the memory constraint. The computer program product further comprises fifth program instructions to assess, when the memory constraint is ended, a reuse-amount of the memory that can be reused based upon the updated monitor data. Preferably, the first, second, third, fourth and fifth program instructions are stored on the medium. In a preferred embodiment, the second program instructions further comprise instructions to allocate one or more pages in the memory to each of a plurality of virtual guests, to identify a subset of the plurality of virtual guests who should be notified when the memory constraint arises and to run a plurality of constraint algorithms to determine whether there is the memory constraint in the memory of the virtual computing system. In a preferred embodiment, the third program instructions further comprise instructions to run a total-release algorithm to calculate the total release-amount of the memory that needs to be released in order to relieve the memory constraint. In a preferred embodiment, the fourth program instructions further comprise instructions to issue the notification to each of the subset of the plurality of virtual guests identified when the memory constraint arises. In a preferred embodiment, the fifth program instructions further comprise instructions to run a reuse algorithm to assess the reuse-number of the memory that can be reused by the subset of the plurality of virtual guests when the memory constraint is ended.

In a preferred embodiment, the computer readable medium comprises a computer storage medium. Preferably, the computer storage medium includes semiconductor memory, magnetic disk, magnetic tape, compact disc (CD), read-only memory (ROM), and/or digital video disc (DVD). The computer program code can be transmitted via a network, such as, cables, routers, switches and/or network adapter cards. Accordingly, the present invention can also be embodied in the form of computer program code, for example, stored in a storage medium, loaded into and/or executed by a computer. The computer program code can be transmitted over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code segments configure the microprocessor to create specific logic circuits. One skilled in the art would appreciate that a set of programmable instructions executed by a processor of the system are required for performing the process steps of the inventive system and method described above.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can store the codes or instructions for use by or in connection with the instruction execution system, apparatus, or device. More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc - read only memory (CD-ROM), compact disc - read/write (CD-R/W) and digital versatile/video disc (DVD).

Figure 6:
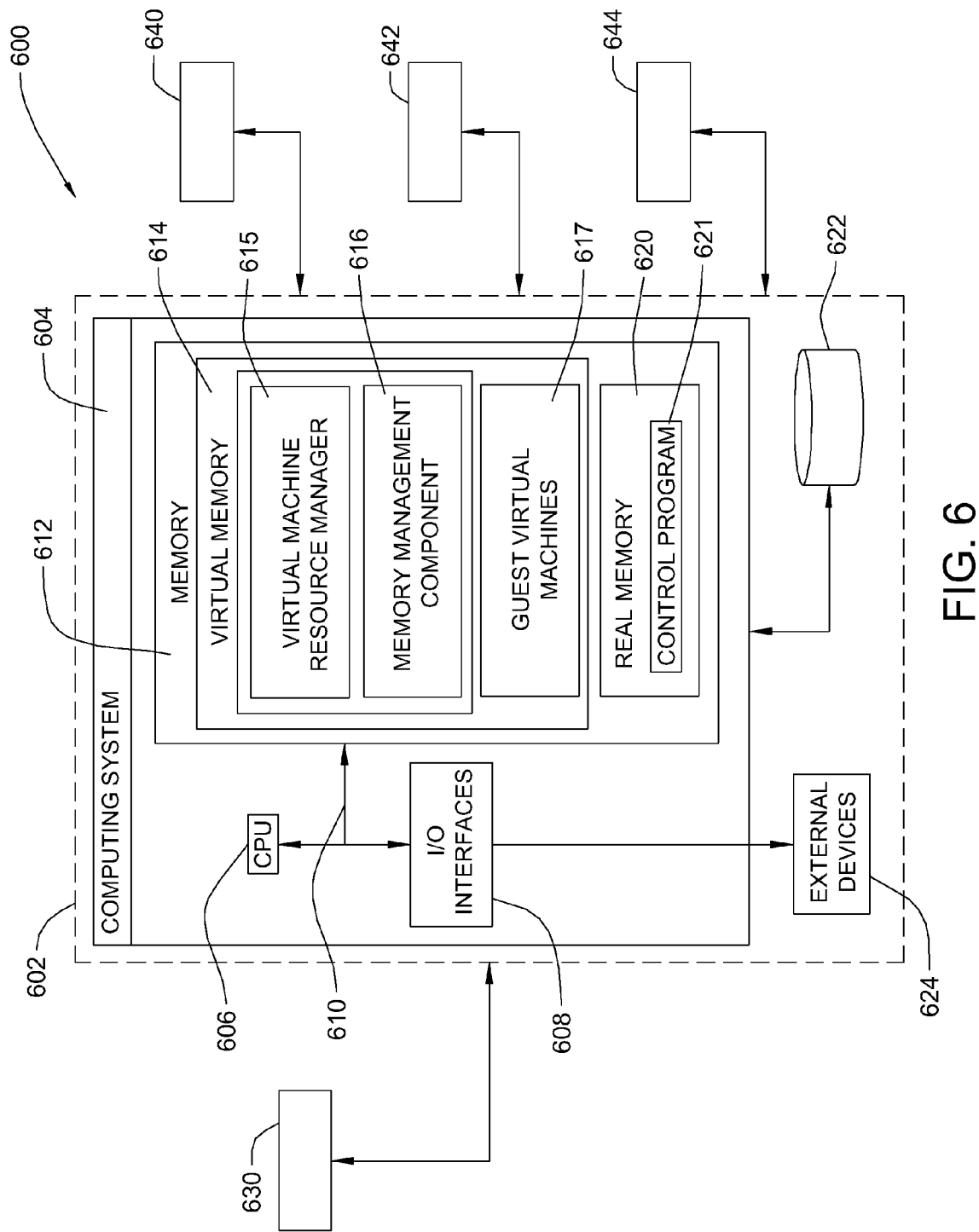
FIG. 6 is a schematic block system diagram illustrating a computer program product for managing memory in a virtual computing system, in accordance with an embodiment of the invention.

Referring to FIG. 6, reference numeral 600 is a schematic block system diagram illustrating a computer program product for managing virtual memory 614 among a plurality of guest virtual machines 617 in a computing system 600. As depicted, computing system 600 includes a computer infrastructure 602, which is intended to represent any type of computer architecture that is maintained in a secure environment (i.e., for which access control is enforced). Computer infrastructure 602 is only illustrative of various types of computer infrastructures for implementing the invention. As shown, infrastructure 602 includes computing system 604, preferably, a virtual computing machine that typically represents a server or the like. It should be understood, however, that although not shown, other hardware and software components (e.g., additional computer systems, routers, firewalls, etc.) could be included in infrastructure 602. In general, a user or a system administrator 630 interfaces with infrastructure 602 for managing virtual memory in a virtual computing system 604. Further, one or more other users or system administrators 640, 642 and 644 can interface with infrastructure 602 to manage virtual memory among the plurality of guest virtual machines 617 in a virtual computing system 604. Alternatively, a system administrator 630 may be a service provider that provides a service to clients, such as clients 640, 642 and 644, where the system administrator 630 can interface with infrastructure 602 to provide a service of managing virtual memory among the plurality of guest virtual machines 617 in a virtual computing system 604. More preferably, the service provider 630 provides a service on a fee or subscription basis to clients 640, 642 and 644. In general, the respective parties 630, 640, 642 and 644 could access infrastructure 602 directly, or over a network via interfaces (e.g., web browsers) loaded on computerized devices (e.g., personal computers, laptops, handheld devices, etc.). In the case of the latter, the network can be any type of network such as the Internet, a local area network (LAN), a wide area network (WAN), a virtual private network (VPN), etc. In any event, communication with infrastructure 602 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol.

Computing system 604 is shown to include a processing unit (CPU) 606, a memory 612, a bus 610, and input/output (I/O) interfaces 608. Further, computing system 604 is shown in communication with external I/O devices/resources 624 and a storage system 622. In general, processing unit 606 executes computer program codes or scripts, such as the memory management component or code 616 and the control program 621, which are stored preferably in memory 612 and, alternatively, can be stored in an external storage system 622. While executing a computer program code, processing unit 606 can read and/or write data, to/from memory 612, the storage system 622, and/or I/O interfaces 608. In a preferred embodiment, the memory 612 includes virtual memory 614 and real memory 620. Further, the virtual memory 614 comprises virtual machine resource manager 615, the memory management component or code 616 and the plurality of guest virtual machines 617, whereas, the real memory 620 comprises the control program 621. Although, memory management component 616 has been shown as being separate from the virtual machine resource manager 615, in an alternative embodiment, the memory management component 616 is incorporated into the virtual machine resource manager 615. Bus 610 provides a communication link between each of the components in computing system 604. External devices 624 can comprise any devices (e.g., keyboard, pointing device, display, etc.) that enable a user to interact with computing system 604 and/or any devices (e.g., network card, modem, etc.) that enable computing system 604 to communicate with one or more other computing devices. Moreover, computing system 604 is only representative of various possible computer systems that can include numerous combinations of hardware. To this extent, in other embodiments, computing system 604 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. For instance, the processing unit 606 may comprise a single processing unit, or be distributed across one or more processing units in one or more locations, e.g., on a client and server. Similarly, memory 612 and/or the storage system 622 can comprise any combination of various types of data storage and/or transmission media that reside at one or more physical locations. Further, I/O interfaces 608 can comprise any system for exchanging information with one or more external devices 624. Still further, it is understood that one or more additional components (e.g., system software, math co-processing unit, etc.—not shown in FIG. 6) can be included in computing system 604. Furthermore, if the computing system 604 comprises a handheld device or the like, it is understood that one or more external devices, for instance, a display could be contained within the computing systems, and not externally as shown for computing system 604. The storage system 622 can be any type of database system capable of providing storage for information under the present invention. To this extent, the storage system 622 could include one or more storage devices, such as a magnetic disk drive or an optical disk drive. In another embodiment, the storage system 622 includes data distributed across, for example, a local area network (LAN), wide area network (WAN) or a storage area network (SAN) (not shown). Although not shown, additional components, such as cache memory, communication systems, system software, etc., may be incorporated into computing system 604.

Accordingly, the present invention can also be embodied in the form of computer program code, for example, stored in a storage medium, loaded into and/or executed by a computer. The computer program code can also be transmitted over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code segments configure the microprocessor to create specific logic circuits. One skilled in the art can appreciate that a set of programmable instructions executed by a processor of the system are required for performing the process steps of the inventive system and method described above. Further, it is understood by one skilled in the art that customized software applications or programs can be developed for a particular business process to perform any or all of the functions carried out by either the virtual machine resource manager and/or the memory management component or code.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for managing allocation of memory to guests of respective virtual machines in a real computer, said method comprising the steps of:

a computer monitoring at least three of the following: a number of said guests on a dispatch list waiting for pages of said memory, a number of times an available-frame of said memory becomes empty for each of said guests, a total working set size of all of said guests on said dispatch list, a number of frames of said memory on an available-frame list, a number of resident pages of said memory for each of said guests, a number of resident referenced frames of said memory, and a number of reserved pages of said memory for each of said guests;

the computer automatically determining, based at least in part on results of said monitoring step, that there is a memory constraint of said memory, and in response, the computer automatically determining amounts of existing memory allocations to said virtual machines to be released by said virtual machines, respectively, to relieve said memory constraint, and the computer automatically sending a notification to said virtual machines to release said respective amounts of their memory allocations; and the computer automatically determining, based at least in part on subsequent results of said monitoring step, that there is not a memory constraint in said memory, and in response, the computer automatically determining additional amounts of said memory currently unallocated to be allocated to said virtual machines, respectively, and the computer automatically allocating said respective additional amounts of said memory to said virtual machines.

2. A method as set forth in claim 1 wherein the step of the computer automatically determining additional amounts of said memory currently unallocated to be allocated to each of said virtual machines is based in part on a difference between an amount of said memory which is currently unallocated and working set sizes of said virtual machines in said dispatch list.

3. A computer program product for managing allocation of memory to guests of respective virtual machines in a real computer, said computer program product comprising:

a computer-readable, tangible storage device;

first program instructions to monitor at least three of the following: a number of said guests on a dispatch list waiting for pages of said memory, a number of times an available-frame of said memory becomes empty for each of said guests, a total working set size of all of said guests on said dispatch list, a number of frames of said memory on an available-frame list, a number of resident pages of said memory for each of said guests, a number of resident referenced frames of said memory, and a number of reserved pages of said memory for each of said guests;

second program instructions to automatically determine, based at least in part on results of said monitoring step, that there is a memory constraint of said memory, and in response, automatically determine amounts of existing memory allocations to said virtual machines to be released by said virtual machines, respectively, to relieve said memory constraint, and automatically send a notification to said virtual machines to release said respective amounts of their memory allocations; and third program instructions to automatically determine, based at least in part on subsequent results of said monitoring step, that there is not a memory constraint in said memory, and in response, automatically determine additional amounts of said memory currently unallocated to be allocated to said virtual machines, respectively, and automatically allocate said respective additional amounts of said memory to said virtual machines; and wherein said first, second and third program instructions are stored on said computer-readable, tangible storage device.

4. A computer program product as set forth in claim 3 wherein said second program instructions automatically determine additional amounts of said memory currently unallocated to be allocated to each of said virtual machines based in part on a difference between an amount of said memory which is currently unallocated and working set sizes of said virtual machines in said dispatch list.

5. A computer system for managing allocation of memory to guests of respective virtual machines in a real computer, said computer system comprising:

first program instructions to monitor at least three of the following: a number of said guests on a dispatch list waiting for pages of said memory, a number of times an available-frame of said memory becomes empty for each of said guests, a total working set size of all of said guests on said dispatch list, a number of frames of said memory on an available-frame list, a number of resident pages of said memory for each of said guests, a number of resident referenced frames of said memory, and a number of reserved pages of said memory for each of said guests;

second program instructions to automatically determine, based at least in part on results of said monitoring step, that there is a memory constraint of said memory, and in response, automatically determine amounts of existing memory allocations to said virtual machines to be released by said virtual machines, respectively, to relieve said memory constraint, and automatically send a notification to said virtual machines to release said respective amounts of their memory allocations;

third program instructions to automatically determine, based at least in part on subsequent results of said monitoring step, that there is not a memory constraint in said memory, and in response, automatically determine additional amounts of said memory currently unallocated to be allocated to said virtual machines, respectively, and automatically allocate said respective additional amounts of said memory to said virtual machines;

a computer-readable, tangible storage device which stores said first, second and third program instructions; and a central processing unit to execute said first, second and third program instructions.

6. A computer system as set forth in claim 5 wherein said second program instructions automatically determine additional amounts of said memory currently unallocated to be allocated to each of said virtual machines based in part on a difference between an amount of said memory which is currently unallocated and working set sizes of said virtual machines in said dispatch list.

* * * * *